United States Patent
Greenberg et al.

(10) Patent No.: US 9,921,296 B2
(45) Date of Patent: Mar. 20, 2018

(54) SYSTEM AND METHOD FOR TESTING FREQUENCY SYNTHESIZER

(71) Applicant: ISRAEL AEROSPACE INDUSTRIES LTD., Lod (IL)

(72) Inventors: Igal Greenberg, Hod Hasharon (IL); Raphael Levy, Petah Tikva (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 414 days.

(21) Appl. No.: 14/762,228

(22) PCT Filed: Nov. 11, 2013

(86) PCT No.: PCT/IL2013/050926
§ 371 (c)(1),
(2) Date: Jul. 21, 2015

(87) PCT Pub. No.: WO2014/128687
PCT Pub. Date: Aug. 28, 2014

(65) Prior Publication Data
US 2015/0378010 A1 Dec. 31, 2015

(30) Foreign Application Priority Data

Feb. 20, 2013 (IL) .......................................... 224819

(51) Int. Cl.
*G01S 7/40* (2006.01)
*G01S 13/28* (2006.01)
*G01S 13/34* (2006.01)

(52) U.S. Cl.
CPC .......... *G01S 7/4008* (2013.01); *G01S 13/282* (2013.01); *G01S 13/34* (2013.01); *G01S 2007/4065* (2013.01)

(58) Field of Classification Search
CPC ................... G01S 13/282; G01S 13/34; G01S 2007/4065; G01S 7/4008
(Continued)

(56) References Cited

U.S. PATENT DOCUMENTS 4,106,020 A 8/1978 Johnson
4,245,221 A 1/1981 Kipp et al.
(Continued)

FOREIGN PATENT DOCUMENTS

GB 939978 A 10/1963
GB 1207565 A 10/1970

*Primary Examiner* — Timothy A Brainard
(74) *Attorney, Agent, or Firm* — Oliff PLC

(57) ABSTRACT

A method of testing a frequency synthesizer over a predetermined frequency range using a delay unit complying with a spectral delay distribution model modeling a spectral delay distribution of the delay unit over the predetermined frequency range. The method comprises generating at least one test signal with the frequency synthesizer according to at least one test command; passing the at least one test signal through the delay unit so as to obtain at least one delayed test signal; measuring at least one shift of a signal attribute between the delayed test signal and the test signal; estimating an accuracy of the frequency synthesizer by comparing the at least one measured shift with an expected shift, the expected shift being derived from the spectral delay distribution model of the delay unit and from the at least one test command.

25 Claims, 8 Drawing Sheets

(58) Field of Classification Search
USPC .......................................................... 342/173
See application file for complete search history.

(56) References Cited

U.S. PATENT DOCUMENTS

| | | |
|---|---|---|
| 4,360,812 A | 11/1982 | Peperone |
| 4,847,623 A | 7/1989 | Jean et al. |
| 5,125,107 A | 6/1992 | Herold et al. |
| 6,397,042 B1 | 5/2002 | Prentice et al. |
| 6,557,117 B1 | 4/2003 | Wu et al. |
| 7,363,563 B1 | 4/2008 | Hissen et al. |
| 2008/0191750 A1 | 8/2008 | Wang |
| 2010/0237924 A1 | 9/2010 | Reeves et al. |
| 2011/0095830 A1* | 4/2011 | Tsangaropoulos ...... G06F 1/025 331/34 |

* cited by examiner

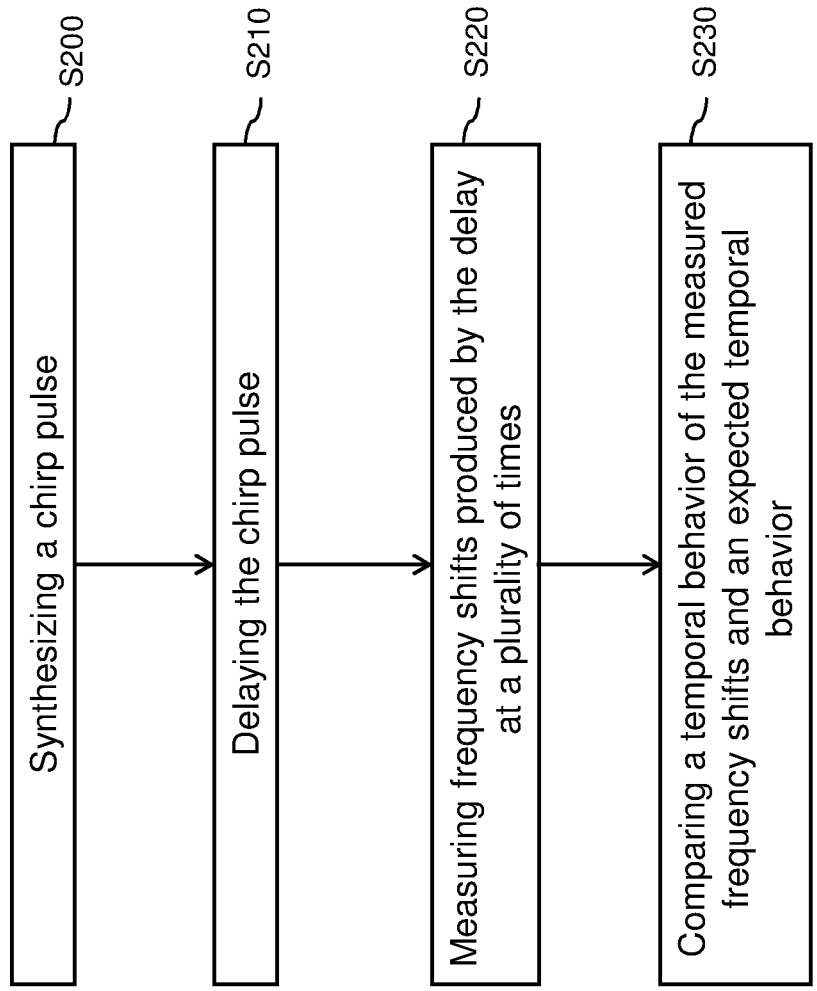

SYSTEM AND METHOD FOR TESTING FREQUENCY SYNTHESIZER

TECHNOLOGICAL FIELD

The present disclosure relates generally to a method of testing a frequency synthesizer using a delay unit and to a system implementing said method. More particularly, the present disclosure relates to a radar system, an electronic warfare system or a communication system with a built in or externally commanded test system for a frequency synthesizer.

BACKGROUND

Frequency synthesizers can be analog or digital devices. Frequency synthesizers are electronic devices enabling generating a range of frequencies from a single fixed reference oscillator. Frequency synthesizers (also referred to as synthesizers in the following) are commonly found in many modern systems such as communication systems (mobile phones, radio receivers, etc.) or radar systems and different technologies coexist for frequency synthesizer implementation. Traditionally, a common technology for implementing synthesizers is phase locked loop (PLL) modules but recent technical developments have driven migration towards more modern direct digital synthesizer (DDS) modules.

Frequency synthesizers are generally required to provide precise frequencies and therefore a regular check of frequency synthesizers can often be beneficial. Synthesizer testing is aimed at determining whether an actual frequency of the synthesizer output signal coincides with a frequency command (i.e. a requested frequency). Synthesizer testing equipment generally requires access to the input/output of the synthesizer and a frequency analyzer to analyze the output signal.

However, because of the space required for such testing equipment and the need for direct access to the input/output of the synthesizer, such systems remain generally confined to laboratory testing and are not contemplated when the synthesizer is integrated (i.e. enclosed) in a complex electronic system. For example, FIG. 1 shows a surveillance system 500 comprising a radar equipment 300. The radar equipment 300 comprises a frequency synthesizer 100. The surveillance system 500 may comprise a controller 400 (also referred as built-in-test—BIT—controller) configured to carry out test procedures of the radar equipment 300. However, notably because of space limitations for adding a specific frequency test equipment, current radar BIT systems do not include a special test for the frequency synthesizer 100 of the radar 300. Additionally, communication and radar systems commonly function in a frequency range comprised between 1 and 100 GHz and testing equipment is not commonly available for the high frequencies of said frequency range.

Some other synthesizer testing methods involve a power detection unit at the output of the synthesizer. For example, the output of the synthesizer is provided with a coupler for directing a portion of the synthesizer output signal to a power detection unit such as a simple diode. Even though such testing methods present the advantage of being easy to integrate into an electronic system, these methods only enable to detect whether the synthesizer outputs a signal or not, and do not provide precise spectral information regarding the output signal. Therefore, these methods cannot precisely ensure that the frequency output of the synthesizer exactly coincides with a frequency command. Nevertheless, it can be noted that methods involving a power detection unit have been largely implemented for testing analog frequency synthesizers such as PLL modules since these methods enable to effectively detect PLL modules dysfunctions. However, such methods do not provide successful results with more recent DDS direct digital synthesizers.

GENERAL DESCRIPTION

The present disclosure provides a new method for testing a frequency synthesizer. The method can advantageously be implemented in a radar system or in a communication system.

In the present application, it is understood that the term 'delay unit' may refer to electrical components connected in series, wherein each individual element creates a time difference or phase change between its input signal and its output signal. The electrical components of the delay line may have a linear behavior. This means that the output signal $y(t)$ of such electrical component in response to a sinusoidal input signal $x(t)=A^*\sin(2\pi ft)$ can be described as:

$$y(t)=k^*A^*\sin\,[2\pi f(t-\tau)+\Phi_0]$$

wherein A is an amplitude of the signal, k is a signal gain, $\Phi_0$ is a constant phase and $\tau$ is a delay introduced by the electrical component independent of the frequency. In some other embodiments, the electrical components may not have a linear behavior and the resulting output signal may be described using a delay dependent on the frequency. For example, such delay may be described with a polynomial function of frequency. Furthermore, in the description, the term 'linear function' refers to a first degree polynomial function of one variable. Additionally, it is considered in the application that the frequency synthesizer is coherent. This means that for any time difference $\Delta t$ between two measurements of the signal for a given frequency f, the phase difference is equal to $2\pi f\Delta t$.

Furthermore, the term modeling and its derivative is used herein to refer to a notion which may encompass the domain of curve approximation. The term comparing and its derivative is used herein to refer to a notion encompassing the domain of correlation. Also, the term sinusoidal pulse may be understood as a single frequency pulsed signal.

Therefore, in one aspect, the present disclosure provides a method of testing a frequency synthesizer over a predetermined frequency range using a delay unit complying with a spectral delay distribution model modeling a spectral delay distribution of the delay unit over the predetermined frequency range. The method comprises generating at least one test signal with the frequency synthesizer according to at least one test command; passing the at least one test signal through the delay unit so as to obtain at least one delayed test signal; measuring at least one shift of a signal attribute between the delayed test signal and the test signal; estimating an accuracy of the frequency synthesizer by comparing the at least one measured shift with an expected shift, the expected shift being derived from the spectral delay distribution model of the delay unit and from the at least one test command.

In one variant (hereinafter also referred to as the second variant), the spectral delay distribution model of the delay unit is expressible as a constant function over the predetermined frequency range, and: generating at least one test signal comprises generating a chirp signal wherein an instantaneous frequency range of the chirp signal covers the predetermined frequency range; measuring at least one shift of a signal attribute comprises measuring a plurality of instantaneous frequency shifts between the delayed test signal and the test signal at a plurality of measurement times; comparing the at least one measured shift with an expected shift comprises evaluating whether a difference between a temporal variation of the instantaneous frequency shifts and an expected constant temporal variation is satisfactory.

In some embodiments of the above variant, the spectral delay distribution model of the delay unit is expressible as a constant function of a predetermined constant value over the predetermined frequency range, and: generating at least one test signal comprises generating a chirp signal with a known chirp rate wherein an instantaneous frequency range of the chirp signal covers the predetermined frequency range; measuring at least one shift of a signal attribute comprises measuring at least one instantaneous frequency shift between the delayed test signal and the test signal; comparing the at least one measured shifts with an expected shift comprises calculating at least one expected shift value and evaluating whether a discrepancy between the at least one measured shift and the at least one expected shift value is satisfactory.

In another variant (hereinafter also referred to as the first variant), generating at least one test signal comprises generating sequentially a plurality of sinusoidal pulses associated to a corresponding plurality of test frequencies comprised in the predetermined frequency range; passing the at least one test signal through the delay unit comprises passing sequentially each sinusoidal pulse through the delay unit so as to obtain a corresponding plurality of delayed sinusoidal pulses; measuring at least one shift of a signal attribute between the delayed test signal and the test signal comprises measuring a plurality of phase shifts, each phase shift corresponding to a phase difference between a delayed sinusoidal signal and a corresponding sinusoidal signal; comparing the at least one measured shift with an expected shift comprises comparing a spectral variation of the measured phase shifts with an expected spectral variation.

In some embodiments of the above variant, comparing a spectral variation of the measured phase shifts with an expected spectral behavior comprises evaluating a level of fit between the spectral distribution of the measured phase shifts and an expected spectral phase shift distribution.

In some embodiments, wherein the spectral delay distribution model of the delay unit is expressible as a constant function over the predetermined frequency range and evaluating a level of fit comprises calculating a linear regression coefficient between the test frequency commands and the measured phase shifts.

In some embodiments, evaluating a level of fit comprises calculating a spread around a linear regression calculated between the test frequency commands and the measured phase shifts.

In some embodiments of the first variant, the method further comprises establishing that the frequency synthesizer is operational when the level of fit reaches a predetermined level of fit. It is noted that similar criterion may also be implemented in the second variant.

In some embodiments of the first variant, the spectral delay distribution model is expressible with a polynomial function of the frequency and at least a polynomial degree of the polynomial function is known.

In some embodiments of the first variant, the spectral delay distribution model is a constant function of a known constant value over the predetermined frequency range and comparing a spectral variation of the measured phase shifts with an expected spectral variation comprises calculating at least one expected phase shift difference associated with a first frequency command and a second frequency command, and comparing said expected phase shift difference and an actual difference between the measured phase shifts.

In some embodiments of the method according to both variants, the at least one test signal comprises a frequency modulated signal or a plurality of sinusoidal signals of predetermined frequencies within the predetermined frequency range.

In some embodiments of the method according to both variants, measuring at least one shift of a signal attribute between the delayed test signal and the test signal comprises: mixing the delayed test signal with a replica of the test signal to obtain a mixed signal; and processing the mixed signal to extract the shift of the signal attribute.

In some embodiments, processing the filtered signal comprises spectral analysis processing.

In another aspect, the present disclosure provides a system capable of providing signals of predefined frequencies comprising: a frequency synthesizer; a delay unit configured at the output of the frequency synthesizer, wherein the delay unit complies with a spectral delay distribution model; and a test unit. The test unit comprises: a command unit configured for commanding the frequency synthesizer to generate at least one test signal according to at least one test command; a measurement unit configured for measuring at least one shift of a signal attribute between the at least one test signal and at least one corresponding delayed test signal at the output of the delay unit; and an estimator unit configured for estimating an accuracy of the frequency synthesizer by comparing the at least one measured shift with an expected shift, the expected shift being derived from the spectral delay distribution model of the delay unit and the at least one test command.

In some embodiments, the frequency synthesizer is capable of generating chirp signals and the command unit is configured for commanding the frequency generator to generate a test signal in the form of a chirp signal.

In some embodiments, the frequency synthesizer is capable of generating sinusoidal signals and the command unit is configured for commanding the frequency generator to generate a plurality of test signals in the form of sinusoidal signals.

In some embodiments, the measurement unit comprises: a coupler at the output of the frequency synthesizer configured for providing a replica of the at least one test signal; a mixer at the output of the delay unit configured for mixing the at least one delayed test signal with the replica of the at least one signals so as to obtain at least one mixed signal; a spectral analyzer configured to extract the at least one shift of the signal attribute between the at least one test signal and at least one corresponding delayed test signal.

In some embodiments, the signal attribute is one of an instantaneous frequency or a phase.

In some embodiments, the delay unit comprises one or more electrical components connected in series.

In some embodiments, the system further comprises: a transmitter configured to amplify signals provided by the frequency synthesizer, an antenna configured to radiate the amplified signals provided by the transmitter; a receiver configured to receive signals reflected back to the antenna; a processing assembly configured to interpret signals provided by the receiver; wherein the transmitter, the antenna, the receiver and the processing assembly are electrically connected in series and the one or more electrical components of the delay line comprise at least a part of: the transmitter, the antenna and the receiver.

In some embodiments, the mixer is comprised in the receiver and the spectral analyzer is comprised in the processing assembly.

In some embodiments, the system further comprises a BIT wire connecting the frequency synthesizer to the antenna and bypassing the transmitter, wherein the one or more electrical components of the delay unit comprises: the BIT wire, an electrical path in the antenna and a radio frequency front end of the receiver.

In another aspect, the present disclosure provides a communication system, an electronic warfare system or radar system comprising a system as previously described.

In another aspect, the present disclosure provides a communication system, an electronic warfare system or a radar system adapted to implement the method as previously described.

In another aspect, the present disclosure provides a radar system, a communication system or an electronic warfare system comprising: a frequency synthesizer configured to generate at least one test signal according to at least test command; a transmitter connected in series to the frequency synthesizer, an antenna connected in series to the transmitter and a receiver connected in series to the antenna, the transmitter, the antenna and the receiver being configured to delay the at least one of test signal according to a spectral delay distribution model so as to obtain delayed test signals; a processing assembly comprising: a mixer connected at the output of the receiver and configured to mix the delayed test signals with a replica of the at least one test signal so as to obtain at least one mixed signal; a spectral analyzer configured to extract at least one shift of a signal attribute between the at least one test signal and at least one delayed test signal from the mixed signals; and an estimator unit configured to estimate an accuracy of the frequency synthesizer by comparing the at least one measured shift with an expected shift, the expected shift being derived from the spectral delay distribution model and the at least one test command.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 4A is a flow chart illustrating steps of a method of testing a frequency synthesizer according to some embodiments of a second variant of the present disclosure.

Like reference numerals refer to corresponding parts in the drawings.

DETAILED DESCRIPTION OF EMBODIMENTS

Described herein are some examples of a method of testing a frequency synthesizer. Furthermore, examples of systems including a frequency synthesizer in which the method can be implemented are presented.

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrase "for example," "such as", "for instance" and variants thereof describe non-limiting examples of the subject matter.

Reference in the specification to "one example", "some examples", "another example", "other examples, "one instance", "some instances", "another instance", "other instances", "one case", "some cases", "another case", "other cases" or variants thereof means that a particular described feature, structure or characteristic is included in at least one example of the subject matter, but the appearance of the same term does not necessarily refer to the same example.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

Unless specifically stated otherwise, as apparent from the following discussions, it is appreciated that throughout the specification discussions utilizing terms such as "generating", "determining", "providing", "receiving", "using", "coding", "handling", "compressing", "spreading", "transmitting", "amplifying", "performing", "forming", "analyzing", "or the like, may refer to the action(s) and/or process(es) of any combination of software, hardware and/or firmware. For example, these terms may refer in some cases to the action(s) and/or process(es) of a programmable machine, that manipulates and/or transforms data represented as physical, such as electronic quantities, within the programmable machine's registers and/or memories into other data similarly represented as physical quantities within the programmable machine's memories, registers and/or other such information storage, transmission and/or display element(s).

Figure 1:
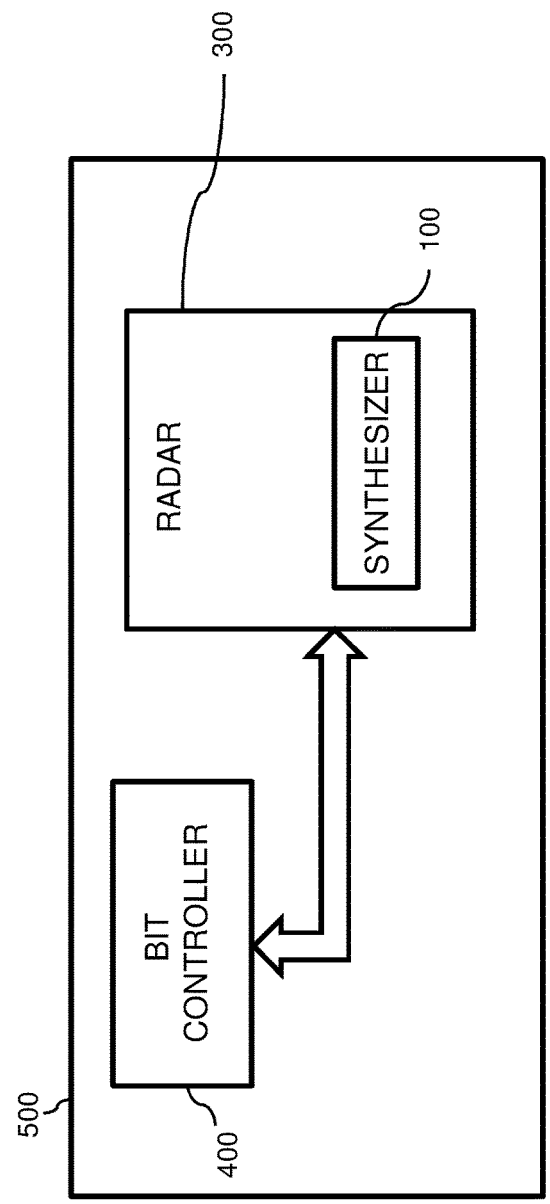
FIG. 1, already described, illustrates a surveillance system provided with a built in test system according to the prior art.
Figure 2A:
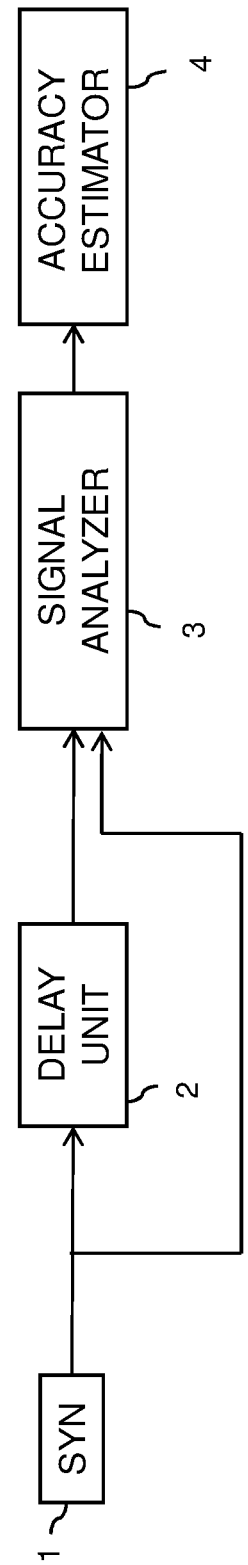
FIGS. 2A and 2B are diagrams illustrating respectively functional elements and steps of a general method according to embodiments of the present disclosure.
Figure 2B:
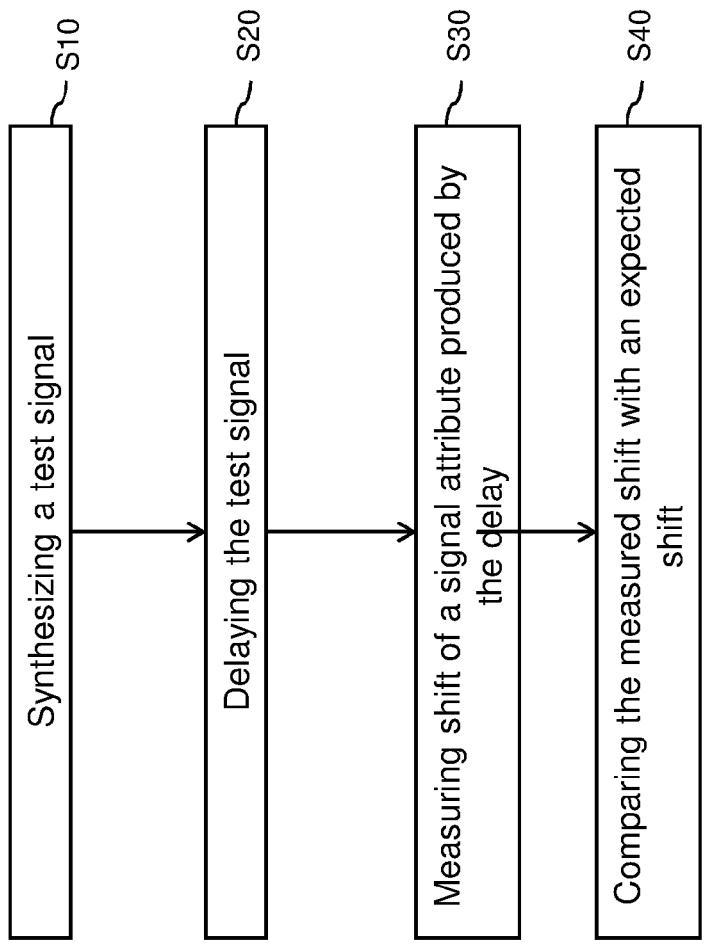

FIGS. 2A and 2B are diagrams illustrating respectively functional elements and steps of a general method according to embodiments of the present disclosure. The present disclosure provides generally for a method and system to test a frequency synthesizer 1 using a delay unit 2. A spectral delay distribution model of the delay unit 2 is at least partially known on a predetermined range of frequencies to be tested. This means that a behavior of the delay produced by the delay unit 2 is at least partially known on the predetermined frequency range. The spectral delay distribution model may comprise parameters, some of which being preliminary known. For example, the delay may be constant over the known test frequency range or vary linearly with the frequency. It is noted that the exact spectral delay distribution may remain unknown but should follow a known spectral delay distribution model. It is understood that a spectral delay distribution model may comprise one or more parameters to be set so as to exactly define the spectral delay distribution. One or more of these parameters may remain partially or totally unknown. For example, in the embodiment in which the spectral delay distribution model is a constant function, the value of the constant which, once set, would precisely define the spectral delay distribution may remain unknown. In general, the method can be applied to any spectral delay distribution model that can be described, for example, with a polynomial function. The degree of the polynomial function may be known while the coefficients may remain as unknown parameters. Furthermore, it is also noted that the term "follow" should be interpreted as "substantially follow" or "substantially expressible with" and include insignificant variations.

In a first step S10, the method comprises synthesizing at least one test signal. It is noted that different embodiments uses different types of test signals. In a first variant, step S10 comprises generating a plurality of sinusoidal pulses of different frequencies within the predetermined frequency range. In a second variant step S10, comprises synthesizing a frequency modulated signal. For example a chirp signal may be generated. Characteristics of the test signal in the first and second variant may be predetermined based on the type of frequency synthesizer or on the frequency range under test.

In a second step S20, the at least one test signal is delayed by the delay unit 2. The delay unit 2 may be a delay line introduced in the system for the purpose of testing the frequency synthesizer 1 or may alternatively be composed of elements of a system in which the frequency synthesizer 1 is integrated. The delay unit 2 output at least one delayed test signal corresponding to the test signal generated by the synthesizer 1.

In a third step S30, at least one shift of a signal attribute between the delayed test signal and the test signal is measured using a signal analyzer 3. In the first variant, the signal attribute is a phase of the signal. In the second variant, the signal attribute is an instantaneous frequency of the signal. In step S30, a difference between the signal attribute of the delayed test signal and the signal attribute of the test signal is measured.

In a fourth step S40, an accuracy estimator unit 4 estimates the accuracy of the frequency synthesizer 1 by comparing the measured shift of the signal attribute to an expected shift of the signal attribute. The partial knowledge of spectral delay distribution model and the characteristics of the test signal may enable to calculate a theoretical (expected) shift of the signal attribute as will be described thereafter in more details. The accuracy of the frequency synthesizer may be evaluated by comparing the expected shift with the measured shift. In certain embodiments, several shifts are measured and step S40 may comprise comparing variations of the measured shifts and variations of the expected shifts. \

For the sake of conciseness, the implementation with the second variant is not completely repeated and the description only describes the difference with respect to the first variant.

The synthesizer 1 may be configured to receive input commands (i.e. be controlled) by a command unit (not shown). In order to execute a testing routine of the synthesizer, the command unit may command the synthesizer 1 to sequentially generate (synthesize) test signals according to test frequencies commands ($f_0, \ldots, f_N$). In the second variant, the command unit may command the synthesizer 1 to generate a chirp signal (or chirp pulse). The test routine may for example be performed periodically or when other predetermined conditions occur. The test frequency commands ($f_0, \ldots, f_N$) may be selected over a predetermined test frequency range. In the second variant, the chirp signal characteristics may be selected so as to sweep the predetermined frequency range. The test frequency range may overlap totally or partially an operational frequency range of the synthesizer. The frequency synthesizer 1 may be of any of a direct analog synthesis type, a direct digital synthesizer type or indirect digital synthesizer type. The frequency synthesizer 1 may use any of phase locked loops, double mix, triple mix, harmonic, double mix divide or direct digital synthesis. The synthesizer 1 may generate frequencies derived from a single, stable master oscillator, for example a crystal oscillator. In some embodiments, incoherent techniques may be used to derive frequencies from a set of several stable oscillators or VCOs (where VCO is a Voltage Controlled Oscillator). Further, and as described below with reference to FIG. 5, the system described in FIG. 2A may be partially or completely integrated in a radar system in an electronic warfare system or in a communication system so as to provide a built-in test system without requiring additional specific test equipment.

The delay unit 2 may delay each test signal (or at least some of the generated test signals used in the following testing method). In the second variant, the delay unit 2 may delay the chirp signal. A delay applied to the test signals by the delay unit may have a known (predetermined) spectral delay distribution model over the predetermined test frequency range. In some embodiments, the delay applied by the delay unit 2 to the test signals may be constant over the predetermined test frequency range. It is noted that the other elements of the system through which the test signals are passed before phase shift measurement—i.e. for example portions of the signal analyzer unit and/or the accuracy estimator unit—are also deemed linear. The delay unit 2 may for example comprise cables, Surface Acoustic Wave devices (SAW) and/or optical delay line. In some embodiments, the delay unit 2 is formed by electrical components of the system connected in series.

The phase shift extraction unit 3 may enable to extract from the delayed signals (in the second variant, from the delayed chirp signal) the phase shifts (respectively the instantaneous frequency shifts at different measurement times) corresponding to the delay introduced by the delay unit. The signal analyzer unit 3 may comprise signal processing elements to form a signal enabling to retrieve said phase shift. For example, the signal analyzer unit 3 may comprise a coupler, a mixer and a low pass filter (not shown). The coupler may be provided at the output of the frequency synthesizer 1 and be configured to split the signal output by the synthesizer 1 thereby enabling to provide a replica of the test signal to the mixer. The mixer may be provided at the output of the delay line 2 and be configured for mixing the delayed test signals (respectively the delayed chirp signal) with the replica of the corresponding test signals (respectively, the chirp signal). The low pass filter may be provided downstream the mixer to filter the high frequencies from the mixed signal. The signal analyzer unit 3 may also comprise a spectral analyzer (not shown) to extract (measure) the phase shift (the instantaneous frequency shift) from the filtered signal provided to the spectral analyzer. The spectral analyzer may perform a phase measurement (frequency measurement) of the signal by an FFT process at an appropriate FFT cell. The FFT process provides filtering. More particularly, by sampling the data for a certain period of time and performing the FFT on the samples, the signal to noise ratio may be improved and the phase of the signal at the frequency in which the signal appears (usually the frequency at which the signal appears is the zero frequency cell unless additional measures are implemented to displace said frequency to another frequency cell to avoid the impact of DC bias) can be extracted. The FFT output may comprise the SIN and COS components of the signal and the phase can be extracted from these components. In the second variant, a block of filters may be used to determine the frequency of the filtered signal thereby providing the frequency shift between the delayed chirp signal and the chirp signal.

The accuracy estimator unit 4 may be configured for comparing a spectral distribution of the measured phase shifts and an expected spectral phase shift distribution, the expected spectral phase shift distribution being derived from the known spectral delay distribution. In the second variant, the accuracy estimator unit 4 may be configured for comparing a temporal distribution (behavior) of the measured frequency shifts and an expected temporal distribution of the frequency shifts. In some embodiments, the spectral analyzer of the signal analyzer unit 3 and the accuracy estimator unit 4 may be gathered into or form a single physical element. In some embodiments, the accuracy estimator unit 4 is configured for evaluating a level of fit between the spectral distribution of the measured phase shifts (respectively temporal distribution of the frequency shifts) and the expected spectral phase shift distribution (respectively expected temporal frequency shift distribution). In some embodiments, the accuracy estimator unit 4 may further be configured to issue a warning if the level of fit reaches a predetermined value. For example, such a warning may be provided to a display device or to a BIT control system. In fact, as explained above, the knowledge of the spectral delay distribution model of the delay line enables to anticipate an expected phase shift spectral distribution (respectively expected instantaneous frequency shift distribution) for the test signals, given the frequencies of said test signals (given the measurement times of the shifts). Therefore, a comparison between the expected and actual variation of a signal attribute shift enables to derive if the actual frequencies of the test signals correspond to the test frequency commands and therefore to estimate if the frequency synthesizer is operational.

Figure 3A:
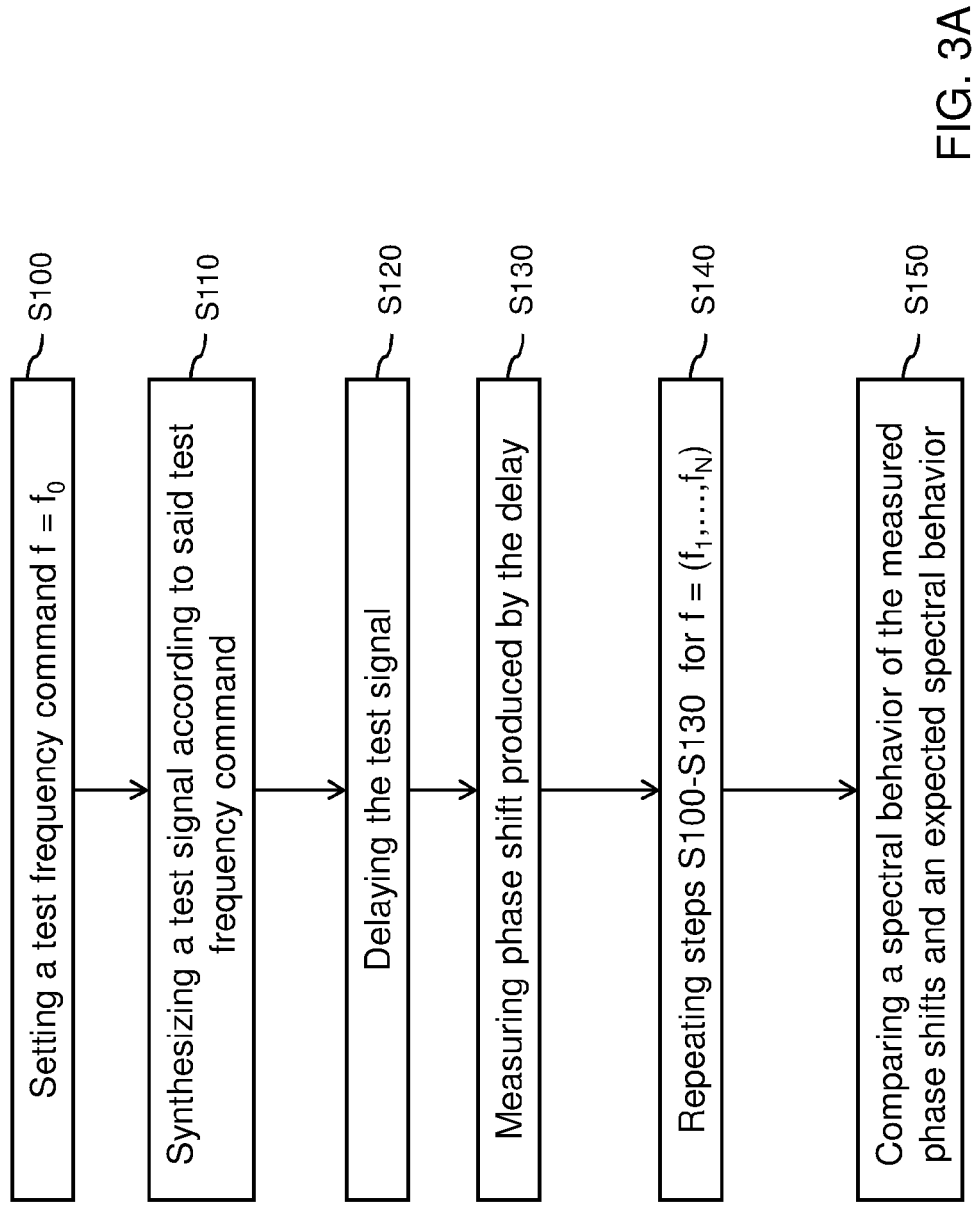
FIG. 3A is a flow chart illustrating steps of a method of testing a frequency synthesizer according to some embodiments of a first variant of the present disclosure.

FIG. 3A is a block diagram illustrating general steps of a method of testing a frequency synthesizer according to some embodiments of the first variant of the present disclosure. In a first step S100, a frequency command f of the frequency synthesizer may be set to a test frequency command $f_0$ within a predetermined test frequency range. The test frequency range may overlap totally or partially an operational frequency range of the synthesizer in which the frequency synthesizer is configured to generate signals. In a second step S110, a test signal may be generated by the frequency synthesizer according to the test frequency command. The test signal can be continuous or form a pulse. In the event the test signal is a pulse, the duration of the pulse may preferably be longer than the delay introduced in step S120. Theoretically, the test signal has a test frequency equal to the test frequency command $f_0$ and a test signal $V_{FS0}$ output from the frequency synthesizer may be represented mathematically as follows:

$$V_{FS0}=A_0*\cos(2\pi*f_0*t+\varphi),$$

wherein $A_0$ is an amplitude of the signal and $\varphi$ is a phase shift of the signal.

In a third step S120, the test signal output from the synthesizer may be delayed to obtain a delayed test signal. The delay applied to the test signal may have (follow) a known spectral delay distribution model. In some embodiments, the delay unit may comprise a delay line. In some embodiments, the synthesizer is integrated in a radar, electronic warfare or communication system and the delay unit may comprise electrical components connected at the output of the frequency synthesizer. It is to be noted that in a radar, the elements are generally such that the delay introduced is a constant i.e. the electrical components at the output of the frequency synthesizer of a radar have a linear behavior. In the following, the case of a constant spectral delay distribution model is illustrated in detail, however it should be understood that an analog reasoning can be applied in the case of a different known (partially or totally preliminarily known) spectral delay distribution model. In the case of a constant delay over the predetermined frequency range, the delayed test signal can theoretically be represented mathematically as follows:

$$V_{D0}=A'_0*\cos[2\pi*f_0*(t-\tau)+\varphi+\varphi'],$$

wherein $A'_0$ is an amplitude of the test signal at the output of the delay unit, $\varphi'$ is an additional phase shift which may be caused by the delay unit and $\tau$ is a delay applied to the test signal. The term $2\pi f_0\tau$ is a deterministic phase accumulated after the time delay $\tau$ and the additional phase shift $\varphi'$ is an arbitrary constant phase that can be generated by any component (a phase shifter or the like) independent of the frequency.

In a fourth step S130, the phase shift produced by the delay unit on the test signal may be measured (extracted) i.e. the additional phase shift $\Phi_0=-2\pi*f_0*\tau+\varphi'$ caused by the delaying of the test signal corresponding to the test frequency command $f_0$ is retrieved. In some embodiments, step S130 may comprise mixing the delayed test signal with a replica of the test signal to obtain a mixed signal; filtering high frequencies from the mixed signal so as to obtain a filtered signal and processing the filtered signal to extract said phase shift. A replica of the test signal may be obtained by using a coupler at the output of the synthesizer to split the test signal and provide to a mixer the replica of the test signal and the delayed test signal. Alternatively, it is possible to use a separate reference signal coherently synchronized with the frequency of the synthesizer as a replica. The mixed signal may theoretically be represented mathematically as follows:

$$V_{m0}=V_{FS0}*V_{D0}=A_0*A'_0*\cos(2\pi*f_0*t+\varphi)*\cos[2\pi*f_0*(t-\tau)+\varphi+\varphi'].$$

The filtering may be performed by using a low pass filter capable of filtering high frequencies to cancel the $4\pi*f_0$ term in the mixed signal. The filtered signal may therefore be represented as follows:

$$V_{f0}=A''_0*\cos(2\pi*f0*\tau-\varphi'),$$

wherein $A''_0$ is an amplitude of the signal at the output of the low pass filter.

Therefore, the filtered signal may provide the phase shift caused by the delaying of the test signal i.e. the shift of phase between the test signal and the delayed test signal. This approach enables to make the phase measurement insensitive to time. Indeed, measuring otherwise the phase change directly would require subtracting the phase accumulated during the elapsed time between two measurements, which is not achievable at such frequencies. In the present approach, both the replica of the test signal and the signal provided to the mixer have accumulated the same phase and this phase is cancelled in the described approach. As can be seen from the above calculation, when the delay is constant over the predetermined frequency range, the phase shift produced by the delay unit theoretically depends linearly on the test frequency. As detailed below, this property may be used to determine if the synthesizer is operational i.e. if the frequencies output by the synthesizer coincide with the frequency commands.

In a fifth step S140, the steps S100, S110, S120 and S130 are repeated with a plurality of test frequency commands $(f_1, \ldots, f_N)$ within the predetermined test frequency range. The number of test frequency commands is generally limited by the time available to perform the test routine and by the amount of channels generable by the synthesizer within the predetermined frequency range. A reasonable amount of test frequency commands may be of around 10 to 20. This leads to obtaining a plurality of phase shifts $(\Phi_1, \ldots, \Phi_N)$ corresponding to the delaying of the test signals generated with test frequency commands $(f_1, \ldots, f_N)$. As described above, for a constant spectral delay distribution, the phase shift $\Phi_i$ theoretically depends linearly on the test frequency command i.e. a theoretical/expected phase shift spectral distribution is a first degree polynomial function of the frequency.

In a sixth step S150, the actual (measured) phase shift spectral distribution is compared to the expected phase shift spectral distribution. In other words, variations of the phase shift for different frequencies of the test signal are compared to theoretical variations of the phase shift between the test signal and the delayed test signal. This enables to estimate whether the measured phase shift follows a theoretical/expected behavior. In some embodiments, a level of fit between the actual phase shift spectral distribution and the expected phase shift spectral distribution is evaluated. In some embodiments, a further step of determining whether the level of fit satisfies a predefined criterion such as a maximal or minimal predetermined threshold, is performed. For example, the step of evaluating a level of fit may comprise calculating a correlation coefficient or calculating a spread of the measured phase shifts around a linear regression obtained between the measured phase shifts and the test frequency commands.

In some embodiments, the delay distribution model is a constant function of a known value over the predetermined frequency range. In these embodiments, the expected linear coefficient can be calculated and it is possible to calculate the difference between two expected phase shifts. Therefore, the step of comparing the measured shifts with corresponding expected shifts (i.e. associated to corresponding frequencies) may comprise determining one or more actual differences between measured phase shifts and evaluating whether one or more actual differences match one or more corresponding expected differences.

Figure 3B:
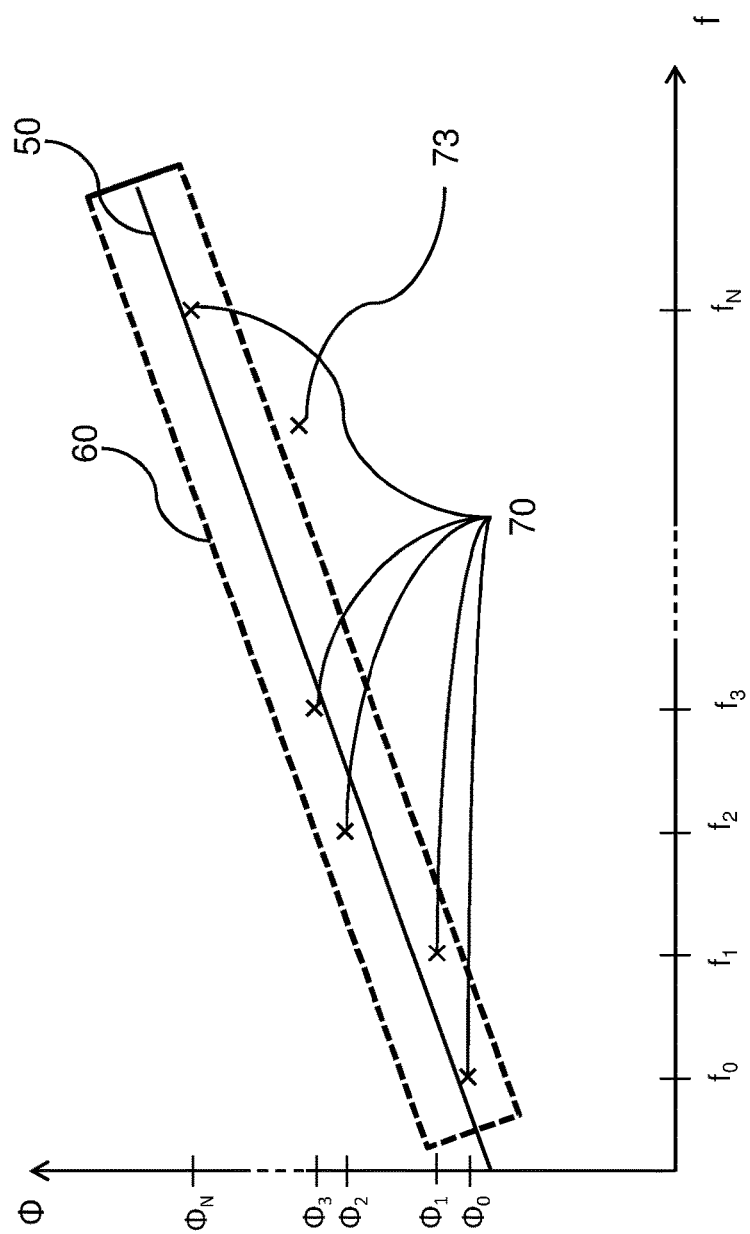
FIG. 3B is a graph illustrating a plurality of phase shift measurements obtainable from a plurality of test frequency commands in some embodiments of the first variant of the present disclosure.

FIG. 3B illustrates a comparison between the actual (measured) and expected phase shift spectral distributions according to embodiments of the first variant of the present disclosure. Particularly, FIG. 3B shows a scatter plot graph 70 representing the measured phase shifts $(\Phi_0, \ldots, \Phi_N)$ function of the test frequency commands $(f_0, \ldots, f_N)$ i.e. the actual/measured phase shift spectral distribution. A line 50 is also represented and illustrates a linear regression line obtained from the measured phase shifts and test frequency commands. The linear regression line may be processed by using least square algorithm algorithms. A range 60 is also represented and illustrates a spread parameter enabling, in some embodiments, to evaluate a level of fit between the measured and expected phase shift spectral distributions. The spread parameter (also referred to directly as "spread") can be defined as a minimal diameter of a range around the linear regression line 50. As can be seen, a decrease in the minimal diameter of the range 60 may be related to the fact that the measured phase shifts are in closer proximity to the linear line 50 and are therefore closer to the expected linear behavior. In some embodiments, evaluating the level of fit between the measured and expected phase shift spectral distributions may be performed by calculating a correlation coefficient between the measured phase shifts and test frequencies. In other words, the comparison between the actual (measured) and expected phase shift spectral distributions may be performed by obtaining the best line fit which is the result of subtraction of a linear function in the case of a constant time delay, or any other polynomial function in the non linear case. In some embodiments, when an aberrant measured phase shift 73 does not fit within the range 60, it may be determined that the synthesizer is not operational.

Figure 4B:
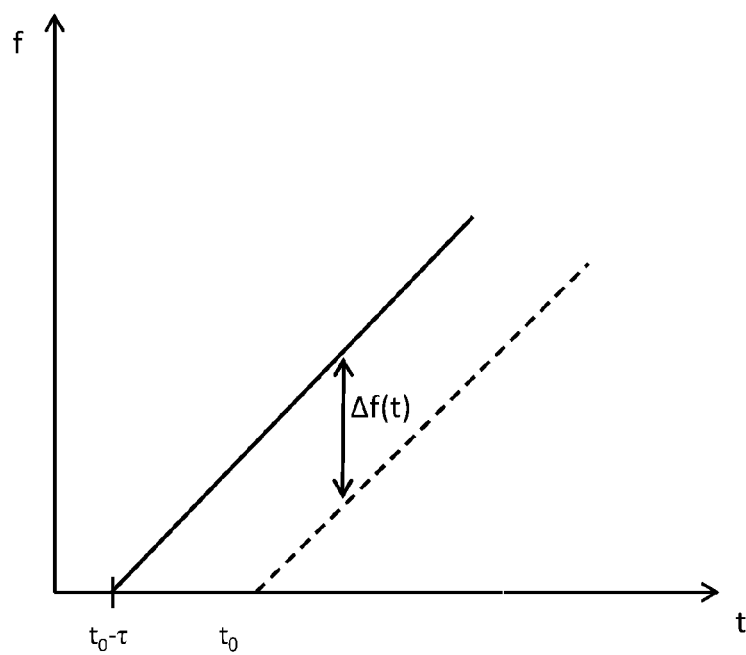
FIG. 4B is a diagram illustrating a theoretical instantaneous frequency shift between a chirp signal and a delayed chirp signal.

FIG. 4A is a block diagram illustrating general steps of a method of testing a frequency synthesizer according to some embodiments of the second variant of the present disclosure. In a first step S200, the frequency synthesizer may generate a test signal in the form of a chirp signal. The chirp signal characteristics (i.e. duration and chirp rate) may be such that the predetermined frequency range is swept by the chirp signal. In a second step S210, the chirp signal may be provided to a delay unit to obtain a delayed test signal in the form of a delayed chirp signal. In the second variant, the spectral delay distribution model is preferably a constant function and the embodiments hereby illustrated consider such constant spectral delay distribution model. As illustrated on FIG. 4B, the frequency of the delayed chirp signal (represented as a plain line on FIG. 4B) is theoretically shifted with respect to the frequency of the chirp signal (represented with dashed lines on FIG. 4B). The instantaneous frequency shift between the delayed chirp signal and the chirp signal is theoretically constant and can be expressed as follows:

$$\Delta f = K^* \tau$$

Wherein K is the chirp rate of the chirp signal and τ is the constant delay introduced by the delay unit. In a third step S220, instantaneous frequency shifts between the delayed chirp signal and the chirp signal may be measured at a plurality of measurement times. In some embodiments, step S220 may comprise mixing the delayed chirp signal with a replica of the chirp signal to obtain a mixed signal; filtering high frequencies from the mixed signal so as to obtain a filtered signal and processing the filtered signal to extract said instantaneous frequency shift. A replica of the test signal may be obtained by using a coupler at the output of the synthesizer to split the test signal and provide to a mixer the replica of the test signal and the delayed test signal. Alternatively, it is possible to use a separate reference signal coherently synchronized with the frequency of the synthesizer as a replica. The mixed signal may theoretically be represented mathematically as follows:

$$V_m = A^* \cos(\omega_0^* t + \tfrac{1}{2}^* K^* t^2)^* \cos[\omega_0^*(t-\tau) + \tfrac{1}{2}^* K^*(t-\tau)^2];$$

Wherein $\omega_0$ is an initial pulsation of the chirp signal.

The filtering may be performed by using a low pass filter capable of filtering high frequencies to cancel the $4\pi^* \omega_0$ term in the mixed signal. The filtered signal may therefore be represented as follows:

$$V_f = A'^* \cos(K^*D^*t + \varphi),$$

wherein A' is an amplitude of the signal at the output of the low pass filter and φ is an initial constant phase.

Figure 4C:
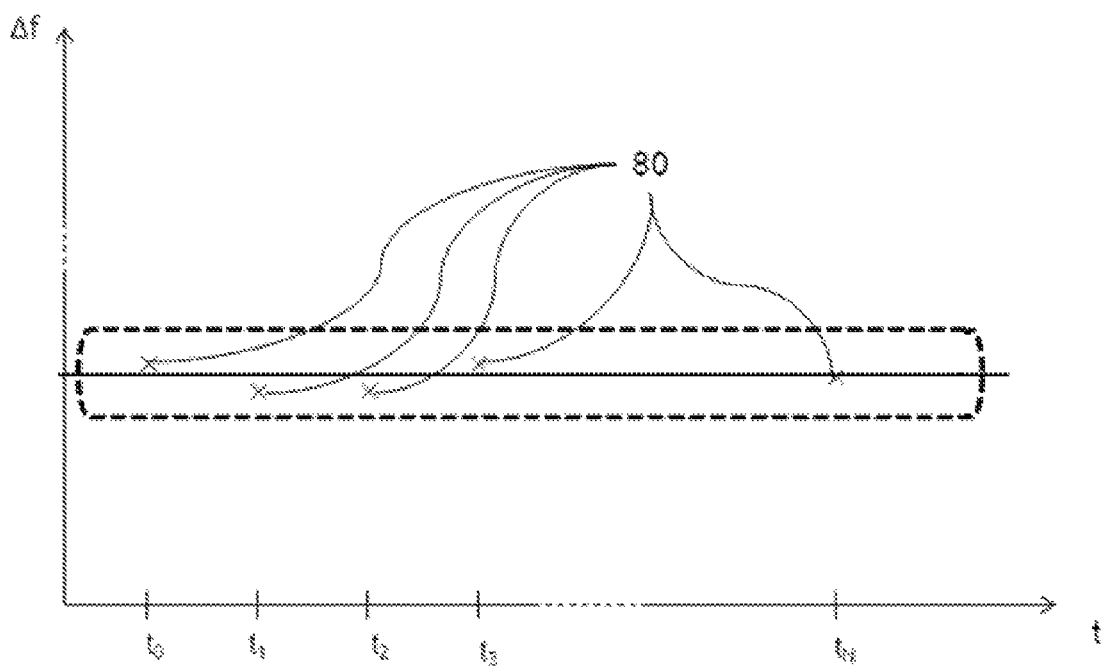
FIG. 4C is a graph illustrating a plurality of instantaneous frequency shift measurements obtainable according to some embodiments of the second variant of the present disclosure.

Therefore, a frequency analysis of the filtered signal may provide the instantaneous frequency shift caused by the delaying of the chirp signal i.e. the shift of instantaneous frequency between the test signal and the delayed test signal. In some embodiments, the filtered signal is provided to a bank of filters to measure the actual frequency of the filtered signal. In some embodiments, the filter may be omitted. FIG. 4C illustrates results of measured instantaneous frequencies 80 at different measurement times ($t_1, \ldots, t_N$). In a step S230, a temporal behavior of the frequency shifts is compared to an expected temporal behavior of the frequency shift. As explained with reference to FIG. 4B, for a constant spectral distribution model, the expected temporal behavior of the frequency shift is a constant function. In some embodiments, a predetermined level of spread around a constant function may be set in order to estimate if the accuracy of the frequency synthesizer is satisfactory. The spread may be represented as a range as illustrated with dashed lines on FIG. 4C.

In some embodiments, the constant delay value of the delay unit is known so that the expected value of the frequency shift ($K^*\tau$) can be calculated. In these embodiments, the step of comparing the plurality of measured shifts may comprise evaluating whether the difference between the measured frequency shifts and the expected value is above a predetermined threshold. Practically, this may enable to measure the frequency shifts using a block of filters having a reduced amount of filters since the expected value of the frequency shift is precisely known.

Figure 5:
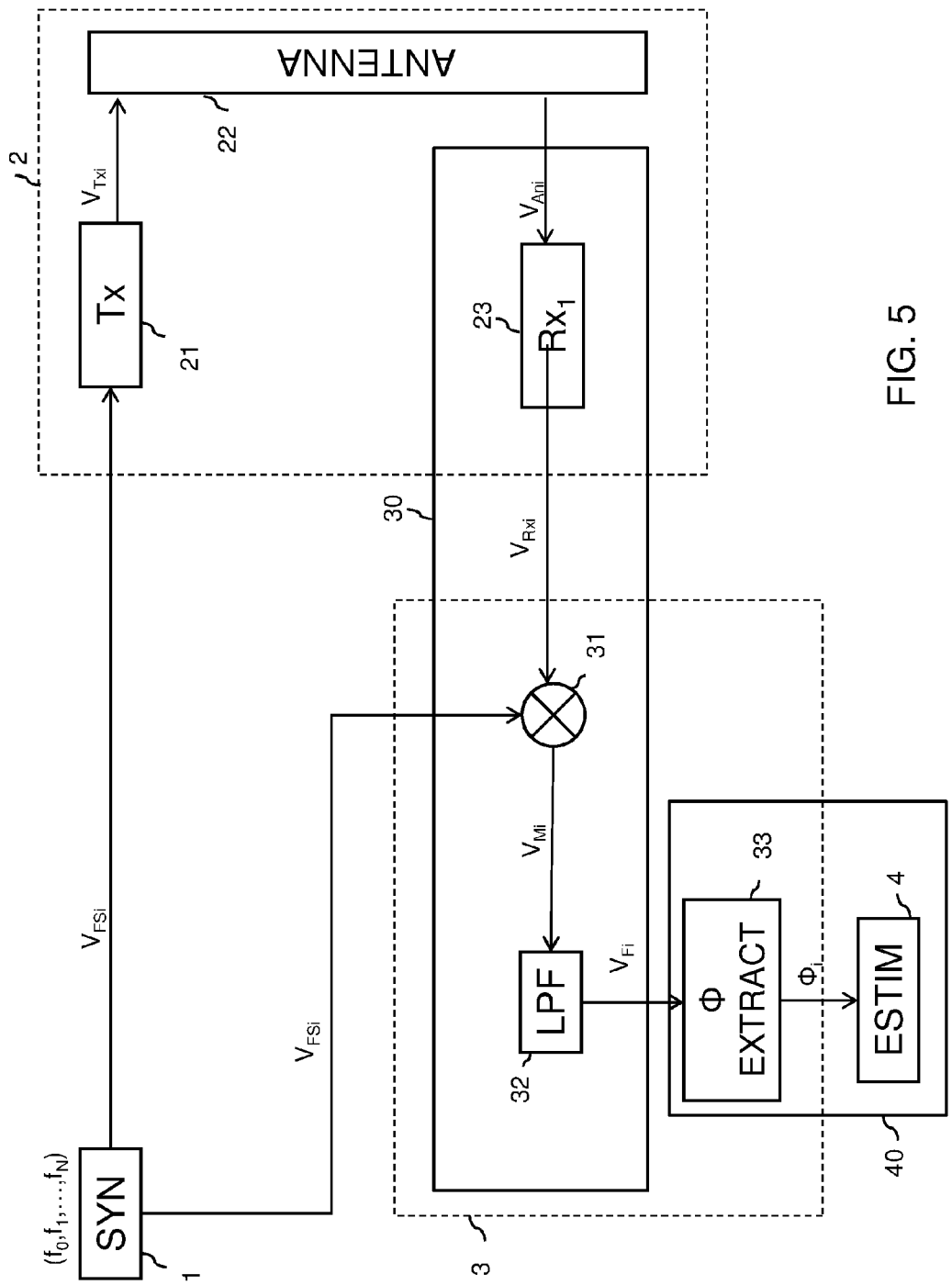
FIG. 5 is a block diagram illustrating elements of a radar system configured to implement the method of testing a frequency synthesizer according to some embodiments of the present disclosure.

FIG. 5 illustrate an example of a system for providing signals of predefined frequencies which enable to test a frequency synthesizer according to both the first and second variant of the previously described method.

With reference to FIG. 5, a radar system adapted to implement the method of the present disclosure is presented. The radar system comprises a frequency synthesizer 1, a transmitter 21, an antenna 22, a receiver 30 and a radar computer assembly 40. For the sake of consistency with the functional description of FIG. 2A, the functional units comprising the delay unit 2 and the signal analyzer unit 3 have been represented on FIG. 6 with dashed lines.

The transmitter 21 may be arranged downstream (connected at the output) of the synthesizer 1 and configured to amplify a signal generated by the synthesizer. When a test routine is launched for example by a test command unit of a BIT control system, one or more test commands are input to the synthesizer. In the first variant, the one or more test commands comprise a plurality of test frequency commands ($f_0, \ldots, f_N$). Alternatively, in the second variant, the one or more test command comprises a chirp command.

The implementation of the first variant is described hereby but it is understood that the second variant can also be implemented similarly. Theoretically, as explained before, the test signal corresponding to the test frequency command $f_i$ output from the synthesizer may have the form:

$$V_{FSi} = A_i^* \cos(2\pi^* f_i^* t + \varphi),$$

wherein $A_i$ is an amplitude of the signal and φ is a phase shift of the signal.

Since the transmitter has a linear behavior, at the output of the transmitter 21, the signal may therefore be represented as $$V_{Txi} = A'_i^* \cos[2\pi^* f_i^* t + \varphi + \varphi_{Tx}]$$

wherein $A'_i$ is an amplitude of the amplified signal and $\varphi_{Tx}$ is an additional phase introduced by the transmitter. It is noted that the phase $\varphi_{Tx}$ introduced by the transmitter may be represented as:

$$\varphi_{Tx} = 2\pi f_i^* \tau_{Tx} + \Phi_{Tx}$$

Wherein $\tau_{Tx}$ is a transmitter delay term and $\Phi_{Tx}$ is a constant arbitrary phase.

The antenna 22 may be provided with the amplified test signal. The amplified test signal may be thereafter provided to the receiver 30. In some embodiments, an electrical path may be provided within the antenna 22 to enable direct passing of a signal to the receiver 30 i.e. without radiating the signal using antenna 22. In some embodiments, the antenna 22 radiates and collects the signal in order to pass it to the receiver 30. For example, the antenna may operate as a continuous wave radar antenna which continuously radiates and collects signals. Further, in some embodiments, a BIT wire (not shown) connected to the output of the synthesizer 1, for example via a coupler (not shown), may be configured to bypass the transmitter 21. Passing the test signal using the BIT wire enables the test signal to be provided to the antenna 22 without being amplified. This may enable to provide the receiver 30 with a signal of reduced power to limit saturation of the receiver 30. In fact, during a test routine in contrast with regular use of the radar, the amplified signal provided by the transmitter 21 may deteriorate the receiver 30, particularly if the amplified signal is passed directly via the BIT wire to the receiver 30. Theoretically i.e. if the frequency provided by the synthesizer is equal to the test frequency command, the signal provided to the receiver may be represented as:

$$V_{Ani} = A''_i^* \cos[2\pi^* f_i^* t + \varphi + \varphi_{Tx} + \varphi_{An}]$$

wherein $A''_i$ is an amplitude of the signal output of the antenna 22, and $\varphi_{An}$ is an additional phase introduced by the antenna 22. It is noted that the phase $\varphi_{An}$ introduced by the antenna 22 may be represented as:

$$\varphi_{An} = 2\pi f_i^* \tau_{An} + \Phi_{An}$$

Wherein $\tau_{An}$ is an antenna delay term and $\Phi_{An}$ is a constant arbitrary phase.

The receiver 30 may comprise a receiver upstream unit 31, a mixer 32 and a low pass filter 33. The receiver upstream unit 31 represents the elements of the receiver which may introduce a phase shift before the signal output from the antenna reaches the phase measurement. The receiver upstream unit is commonly referred to as RFFE (radio frequency front end) and may comprise a low noise amplifier (LNA), filters, attenuators and amplifiers. Therefore, at the output of the receiver upstream unit 31 i.e. at the input of the mixer 32, the signal may be represented as:

$$V_{Rxi} = B_i^* \cos[2\pi^* f_i^* t + \varphi + \varphi_{Tx} + \varphi_{An} + \varphi_{Rx}]$$

wherein B is an amplitude of the signal output by the receiver upstream unit 31 and $\varphi_{Rx}$ an additional phase introduced by the receiver upstream unit 31. It is noted that the phase $\varphi_{Rx}$ may be represented as:

$$\varphi_{Rx} = 2\pi f_i^* \tau_{Rx} + \Phi_{Rx}$$

Wherein $\tau_{Rx}$ is an RFFE delay term and $\Phi_{Rx}$ is a constant arbitrary phase.

The mixer 32 may be provided with the signal output from the receiver upstream unit 31 and with a replica of the signal from the synthesizer 1. Therefore, during the test routine, the signal obtained at the output of the mixer 32 can be represented as:

$$V_{Mi} = B'_i * \cos[2\pi * f_i * t + \varphi + \varphi_{Tx} + \varphi_{An} + \varphi_{Rx}] * \cos(2\pi * f_i * t + \varphi)$$

The low pass filter 33 may be provided with the signal output from the mixer 32. Therefore, during the test routine the signal obtained at the output of the filter 33 which cancels the term in $4\pi * f_i$ may be represented as:

$$V_{Fi} = B''_i * \cos(\varphi_{Tx} + \varphi_{An} + \varphi_{Rx})$$
$$= B''_i * \cos(2\pi f_i * \tau + \Phi)$$

wherein $B''_i$ is an amplitude of the signal, $\tau$ is a delay constant and $\Phi$ is a constant arbitrary phase.

Therefore, the filtered signal available at the output of the receiver of a radar system provides a simple access to retrieve the phase shifts introduced by the delay unit formed by the elements of the radar system on the test signals. Since the phase shift introduced depends linearly on the frequency of the signal, if the frequencies output by the synthesizer coincide with the test frequency commands, the plot of the actual phase shifts function of the test frequency commands should be a straight line. It is therefore possible to verify if the synthesizer is operational by comparing the plot of the actual phase shifts function of the test frequency commands to a linear function as explained with reference to FIG. 3B.

The filtered signal may further be provided to the radar computer assembly 40 for extracting the phase shift produced by the elements of the radar system on the test signals and for performing the comparing step in order to determine if the synthesizer is operational. The radar computer assembly may comprise a spectral analyzer 33 and a accuracy estimator unit 4. The spectral analyzer 33 may extract the phase shift from the filtered signal and the processing unit 4 may operate the comparing step.

As explained above, in the second variant, the chirp signal can be similarly delayed and provided to the mixer 32 and low pass filter 33. The resulting filtered signal may be provided to the radar computer assembly for extracting a frequency of the filtered signal and for performing the comparing step in order to determined if the synthesizer 1 is operational. When the spectral delay distribution model of the delay unit is a constant function of frequency, the comparing step may comprise verifying that the frequency of the filtered signal is constant.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method of testing a frequency synthesizer over a predetermined frequency range using a delay unit complying with a spectral delay distribution model modeling a spectral delay distribution of the delay unit over the predetermined frequency range, the method comprising:
   generating at least one test signal with the frequency synthesizer according to at least one test command;
   passing the at least one test signal through the delay unit so as to obtain at least one delayed test signal;
   measuring at least one shift of a signal attribute between the delayed test signal and the test signal;
   estimating an accuracy of the frequency synthesizer by comparing the at least one measured shift with an expected shift, the expected shift being derived from the spectral delay distribution model of the delay unit and from the at least one test command.

2. The method according to claim 1, wherein the spectral delay distribution model of the delay unit is expressible as a constant function over the predetermined frequency range and:
   generating at least one test signal comprises generating a chirp signal wherein an instantaneous frequency range of the chirp signal covers the predetermined frequency range;
   measuring at least one shift of a signal attribute comprises measuring a plurality of instantaneous frequency shifts between the delayed test signal and the test signal at a plurality of measurement times;
   comparing the at least one measured shift with an expected shift comprises evaluating whether a difference between a temporal variation of the instantaneous frequency shifts and an expected constant temporal variation is satisfactory.

3. The method according to claim 1, wherein the spectral delay distribution model of the delay unit is expressible as a constant function of a predetermined constant value over the predetermined frequency range and:
   generating at least one test signal comprises generating a chirp signal with a known chirp rate wherein an instantaneous frequency range of the chirp signal covers the predetermined frequency range;
   measuring at least one shift of a signal attribute comprises measuring at least one instantaneous frequency shift between the delayed test signal and the test signal;
   comparing the at least one measured shifts with an expected shift comprises calculating at least one expected shift value and evaluating whether a discrepancy between the at least one measured shift and the at least one expected shift value is satisfactory.

4. The method according to claim 1, wherein:
   generating at least one test signal comprises generating sequentially a plurality of sinusoidal pulses associated to a corresponding plurality of test frequencies comprised in the predetermined frequency range;
   passing the at least one test signal through the delay unit comprises passing sequentially each sinusoidal pulse through the delay unit so as to obtain a corresponding plurality of delayed sinusoidal pulses;
   measuring at least one shift of a signal attribute between the delayed test signal and the test signal comprises measuring a plurality of phase shifts, each phase shift corresponding to a phase difference between a delayed sinusoidal signal and a corresponding sinusoidal signal;
   comparing the at least one measured shift with an expected shift comprises comparing a spectral variation of the measured phase shifts with an expected spectral variation.

5. The method according to claim 4, wherein comparing a spectral variation of the measured phase shifts with an expected spectral behavior comprises evaluating a level of fit between the spectral distribution of the measured phase shifts and an expected spectral phase shift distribution.

6. The method according to claim 5, wherein the spectral delay distribution model of the delay unit is expressible as a constant function over the predetermined frequency range and evaluating a level of fit comprises calculating a linear regression coefficient between the test frequency commands and the measured phase shifts.

7. The method according to claim 6, wherein evaluating a level of fit comprises calculating a spread around a linear regression calculated between the test frequency commands and the measured phase shifts.

8. The method according to claim 5, further comprising establishing that the frequency synthesizer is operational when the level of fit reaches a predetermined level of fit.

9. The method according to claim 4, wherein the spectral delay distribution model is expressible with a polynomial function of the frequency and at least a polynomial degree of the polynomial function is known.

10. The method according to claim 4, wherein the spectral delay distribution model is a constant function of a known constant value over the predetermined frequency range and comparing a spectral variation of the measured phase shifts with an expected spectral variation comprises calculating at least one expected phase shift difference associated with a first frequency command and a second frequency command, and comparing said expected phase shift difference and an actual difference between the measured phase shifts.

11. The method according to claim 1, wherein the at least one test signal comprises a frequency modulated signal or a plurality of sinusoidal signals of predetermined frequencies within the predetermined frequency range.

12. The method according to claim 1, wherein measuring at least one shift of a signal attribute between the delayed test signal and the test signal comprises:
mixing the delayed test signal with a replica of the test signal to obtain a mixed signal; and
processing the mixed signal to extract the shift of the signal attribute.

13. The method according to claim 12, wherein processing the filtered signal comprises spectral analysis processing.

14. A communication system, an electronic warfare system or a radar system adapted to implement the method according to claim 1.

15. A system capable of providing signals of predefined frequencies comprising:
a frequency synthesizer;
a delay unit configured at the output of the frequency synthesizer, wherein the delay unit complies with a spectral delay distribution model; and
a test unit comprising:
a command unit configured for commanding the frequency synthesizer to generate at least one test signal according to at least one test command;
a measurement unit configured for measuring at least one shift of a signal attribute between the at least one test signal and at least one corresponding delayed test signal at the output of the delay unit; and
an estimator unit configured for estimating an accuracy of the frequency synthesizer by comparing the at least one measured shift with an expected shift, the expected shift being derived from the spectral delay distribution model of the delay unit and the at least one test command.

16. The system according to claim 15, wherein the frequency synthesizer is capable of generating chirp signals and the command unit is configured for commanding the frequency generator to generate a test signal in the form of a chirp signal.

17. The system according to claim 15, wherein the frequency synthesizer is capable of generating sinusoidal signals and the command unit is configured for commanding the frequency generator to generate a plurality of test signals in the form of sinusoidal signals.

18. The system according to claim 15, wherein the measurement unit comprises:
a coupler at the output of the frequency synthesizer configured for providing a replica of the at least one test signal;
a mixer at the output of the delay unit configured for mixing the at least one delayed test signal with the replica of the at least one signals so as to obtain at least one mixed signal;
a spectral analyzer configured to extract the at least one shift of the signal attribute between the at least one test signal and at least one corresponding delayed test signal.

19. The system according to claim 15, wherein the signal attribute is one of an instantaneous frequency or a phase.

20. The system according to claim 15, wherein the delay unit comprises one or more electrical components connected in series.

21. The system according to claim 15, further comprising:
a transmitter configured to amplify signals provided by the frequency synthesizer,
an antenna configured to radiate the amplified signals provided by the transmitter;
a receiver configured to receive signals reflected back to the antenna;
a processing assembly configured to interpret signals provided by the receiver;
wherein the transmitter, the antenna, the receiver and the processing assembly are electrically connected in series and the one or more electrical components of the delay line comprise at least a part of: the transmitter, the antenna and the receiver.

22. The system according to claim 21, wherein the measurement unit comprises:
a coupler at the output of the frequency synthesizer configured for providing a replica of the at least one test signal;
a mixer at the output of the delay unit configured for mixing the at least one delayed test signal with the replica of the at least one signals so as to obtain at least one mixed signal;
a spectral analyzer configured to extract the at least one shift of the signal attribute between the at least one test signal and at least one corresponding delayed test signal,
wherein the mixer is comprised in the receiver and the spectral analyzer is comprised in the processing assembly.

23. The system according to claim 21, further comprising a BIT wire connecting the frequency synthesizer to the antenna and bypassing the transmitter, wherein the one or more electrical components of the delay unit comprises: the BIT wire, an electrical path in the antenna and an radio frequency front end of the receiver.

24. A communication system, an electronic warfare system or radar system comprising a system according to claim 15.

25. A radar system, a communication system or an electronic warfare system comprising:
a frequency synthesizer configured to generate at least one test signal according to at least test command;

a transmitter connected in series to the frequency synthesizer, an antenna connected in series to the transmitter and a receiver connected in series to the antenna, the transmitter, the antenna and the receiver being configured to delay the at least one of test signal according to a spectral delay distribution model so as to obtain delayed test signals;

a processing assembly comprising:

a mixer connected at the output of the receiver and configured to mix the delayed test signals with a replica of the at least one test signal so as to obtain at least one mixed signal;

a spectral analyzer configured to extract at least one shift of a signal attribute between the at least one test signal and at least one delayed test signal from the mixed signals; and an estimator unit configured to estimate an accuracy of the frequency synthesizer by comparing the at least one measured shift with an expected shift, the expected shift being derived from the spectral delay distribution model and the at least one test command.

\* \* \* \* \*